United States Patent

Dohmen et al.

[11] Patent Number: 5,832,591
[45] Date of Patent: Nov. 10, 1998

[54] METHOD OF MANUFACTURING A MAGNETIC HEAD UNIT

[75] Inventors: Gerardus M. Dohmen; Johannes P. Haisma; Victor Zieren, all of Eindhoven, Netherlands

[73] Assignee: U.S. Philips Corporation, New York, N.Y.

[21] Appl. No.: 378,237

[22] Filed: Jan. 25, 1995

[30] Foreign Application Priority Data

Jan. 27, 1994 [BE] Belgium ................................. 09400097

[51] Int. Cl.$^6$ ............................................. G11B 5/42
[52] U.S. Cl. ................................. 29/603.05; 29/603.06
[58] Field of Search ........................... 29/603.04, 603.05, 29/603.06, 603.01, 603.03; 360/126

[56] References Cited

U.S. PATENT DOCUMENTS 4,030,189  6/1977  Lazzari ................................. 29/603.06

FOREIGN PATENT DOCUMENTS 0528459   2/1993   European Pat. Off. .
61184711  8/1996   Japan .

*Primary Examiner*—Carl E. Hall
*Attorney, Agent, or Firm*—Norman N. Spain

[57] ABSTRACT

Method in which a magnetic head unit is manufactured from a magnetic head and a support. The magnetic head is manufactured by providing a thin-film magnetic head structure with a ground conductor on an electrically conducting substrate. Before the magnetic head is secured to the support, an electrically insulating layer present on an outer side of the substrate is removed, whereafter an electrically conducting contact layer (39) is formed on the surface obtained. By securing the magnetic head to the support, the contact layer will be in contact with parts (43*a*, 43*b*) of the support for the purpose of grounding the support.

20 Claims, 2 Drawing Sheets

METHOD OF MANUFACTURING A MAGNETIC HEAD UNIT

The invention relates to a method of manufacturing a magnetic head unit from a magnetic head and a support, the magnetic head comprising an electrically conducting substrate and a multilayer structure arranged against the substrate and having a transducing element, and engaging the support.

BACKGROUND OF THE INVENTION

The invention also relates to a method of manufacturing a magnetic head suitable for use in the method of manufacturing a magnetic head unit.

Such methods are known from EP 0 528 459 (PHN 13.795; herewith incorporated by reference). In accordance with the known methods, a magnetic head is manufactured from an electrically conducting and magnetically conducting or non-conducting substrate and a thin-film structure which is composed of magnetic layers, electric layers and insulation layers, and a magnetic head unit is obtained by fixing the manufactured magnetic head in a central aperture of a support in the form of a housing. The magnetic head comprises transducing elements and has a head face in which transducing gaps terminate. To protect the thin-film structure, a protection block is provided. The housing of the magnetic head unit is provided with tape guides at both sides of the magnetic head for the purpose of accurately guiding a magnetic tape along the magnetic head.

To inhibit damage due to electrostatic discharges during use of a magnetic head unit, it is important that the magnetic head as well as the support for the magnetic head are grounded. An electrically conducting substrate of the magnetic head can be connected to ground by providing a ground conductor in the magnetic head and by establishing an electrical connection between the substrate and the ground conductor. This can be realised, for example via an electrically conducting layer on the head face of the magnetic head, with which the protective block is also grounded. As long as the support is entirely made of a metal, it can be connected to ground during assembly in a magnetic tape apparatus by fixing it to a metal part of the housing. However, the current progressive technical developments provide the possibility of replacing metal construction parts entirely or partly to an ever-increasing extent by other, non-electrically conducting components such a polycarbonate reinforced with glass fibre. This means that the grounding of the support of the magnetic head unit is no longer automatically ensured after the unit has been mounted in a magnetic tape apparatus.

SUMMARY OF THE INVENTION

It is an object of the invention to provide a method by which a magnetic head unit is obtained which is provided with means ensuring a safe depletion of electric charge.

According to the invention, the method of manufacturing the magnetic head unit is characterized in that an electrically insulating layer present on a substrate side facing the exterior is removed for forming a surface, whereafter an electrically conducting material for forming an electrically conducting contact layer is deposited on the surface formed, whereafter the magnetic head is secured to the support, while the electrically conducting contact layer is contacted with the support. In this way a reliable low-ohmic connection between the support and the electrically conducting substrate is obtained. The insulating layer obtained, for example by surface treatments or ambient influences can be removed by means of known techniques such as sputter-etching, laser ablation or engraving, whereafter the electrically conducting contact layer can be formed on the conducting surface thus obtained. The electrically conducting contact layer can be formed by means of known deposition techniques by depositing electrically conducting material, for example Au, Cr or CrN.

An embodiment of the method according to the invention is characterized in that a substrate of electrically conducting aluminum oxide-titanium carbide ($Al_2O_3$—TiC) is used as a substrate, in which the electrically insulating layer comprises titanium oxide formed by oxidation, which layer is removed before the electrically conducting contact layer is formed. It has been found that titanium carbide decomposes due to mechanical processing operations on said ceramic substrate, with an electrically insulating layer of titanium oxide being formed in an oxygen-containing ambience. By removing this oxide layer and by subsequently providing electrically conducting material, a reliable grounding of the support is obtained when the magnetic head is mounted on the support.

An embodiment of the method according to the invention is characterized in that a silicon substrate is used as a substrate, in which the electrically insulating layer comprises silicon oxide formed by oxidation, which layer is removed before the electrically conducting contact layer is formed. It has been found that silicon oxide is formed on the surface of said semiconductor substrate by ambient influences.

An embodiment of the method according to the invention is characterized in that a substrate of an electrically conducting ferrite is used as a substrate, in which the electrically insulating layer is a surface layer formed by mechanical treatment, which layer is removed before the electrically conducting contact layer is formed. A suitable ferrite is, for example monocrystalline or polycrystalline MnZn ferrite. As a result of mechanical operations such as sawing, grinding or polishing, metal ions are removed from a zone contiguous to the processed surface so that an electrically insulating or at least an electrically poorly conducting surface layer is obtained.

The electrically insulating layer is preferably removed from the substrate by bombarding a surface to be treated of the substrate placed in a vacuum or low-pressure space with ions. Subsequently, and preferably in a similar space, particularly the same space, electrically conducting material is sputtered on the surface treated for forming the electrically conducting contact layer. It has been found that Cr is particularly suitable for forming the contact layer, due to its favourable properties of inertia, electrical conductivity, sputtering capacity and adhesive strength.

An embodiment of the method according to the invention is characterized in that an electrically conducting adhesive is provided between the electrically conducting contact layer on the substrate and the support. A suitable adhesive is, for example an epoxy resin having electrically conducting particles such as, for example Ag particles.

It is also an object of the invention to provide a method of manufacturing a magnetic head which is suitable for use in the previously mentioned method according to the invention.

According to the invention, the method of manufacturing a magnetic head, starting from an electrically conducting substrate on which a multilayer structure, particularly a thin-film structure is formed, is characterized in that electrically conducting material for forming a ground conductor is deposited during formation of the multilayer structure, the ground conductor being electrically connected to the substrate.

An embodiment of the method according to the invention is characterized in that prior to depositing electrically conducting material for forming the ground conductor, a lead-through aperture extending as far as the substrate is provided in an insulation layer which is already present on the substrate, and the substrate is provided with an electrically conducting surface at the area of the lead-through aperture, whereafter electrically conducting material for forming the ground conductor and a connection between the ground conductor and the substrate is deposited on the insulation layer and, through the lead-through aperture, on the electrically conducting surface of the substrate. In this way a reliable electrical connection between the substrate and the ground conductor is ensured in the magnetic head obtained by means of the method according to the invention.

The invention also relates to a magnetic head unit which is obtainable by means of the relevant method according to the invention.

The magnetic head unit according to the invention comprises a magnetic head having an electrically conducting substrate and a multilayer structure engaging the substrate and comprising at least a transducing element, and a support for the magnetic head, and is characterized in that the substrate is electrically connected to a ground conductor of the magnetic head, a substrate surface facing the support being provided with a contact layer of an electrically conducting material, which layer engages the support.

An embodiment of the magnetic head unit according to the invention is characterized in that the support is electrically conducting and is secured on an electrically insulating base associated with the magnetic head unit. The base is preferably made of a filed synthetic resin material, for example a polycarbonate filled with glass fibre.

An embodiment of the magnetic head unit according to the invention is characterized in that an electrically conducting adhesive is present at least locally between the contact layer of an electrically conducting material and the support. A suitable adhesive is, for example an adhesive based on an epoxy resin or polyimide and filled with suitable metal particles such as Ag or Ni particles.

The invention further relates to a magnetic head which is obtainable by means of the relevant method according to the invention and is suitable for use in the magnetic head unit according to the invention.

The magnetic head according to the invention has a head face and comprises an electrically conducting substrate and a multilayer structure present on the substrate provided with a transducing element and a transducing gap terminating in the head face, and is characterized in that a ground conductor in the multilayer structure is in direct contact with the substrate via a lead-through aperture and is provided with an abutting face.

An embodiment of the magnetic head according to the invention is characterized in that an electrically conducting ceramic substrate is used as a substrate, preferably electrically conducting aluminum oxide-titanium carbide ($Al_2O_3$—TiC).

An embodiment of the magnetic head according to the invention is characterized in that a semiconductor substrate is used as a substrate, preferably silicon.

An embodiment of the magnetic head according to the invention is characterized in that an electrically conducting ferrite substrate is used as a substrate, preferably an MnZn ferrite.

DESCRIPTION OF THE PREFERRED EMBODIMENTS

These and other aspects of the invention will be apparent from and elucidated with reference to the embodiments described hereinafter.

Figure 1:
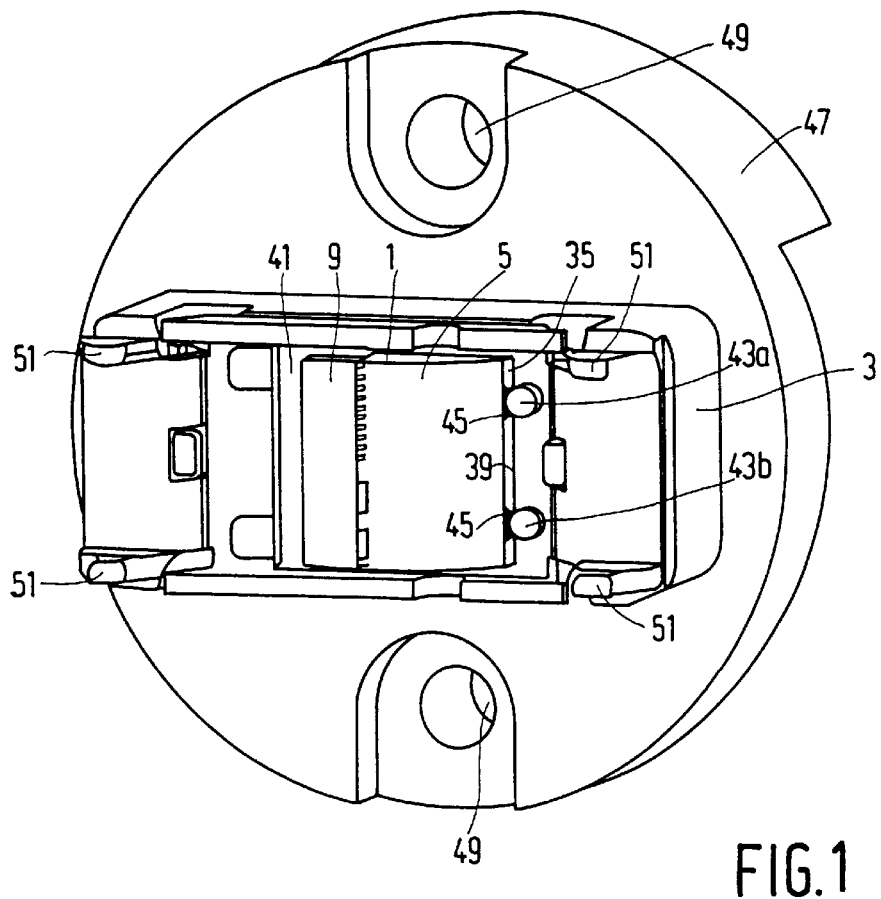
FIG. 1 is a perspective elevational view of an embodiment of the magnetic head unit according to the invention.

The embodiment of the magnetic head unit according to the invention shown in FIG. 1 comprises a magnetic head 1 and a support 3. An embodiment of the magnetic head 1, which is shown in greater detail in FIGS. 2 and 3, comprises an electrically conducting block 5, a multilayer structure 7 provided on the block 5, particularly a thin-film magnetic head structure, and a counterblock 9 for protecting the multilayer structure 7. In this embodiment, the electrically conducting block 5, further referred to as substrate 5, and the counterblock 9 are manufactured of an electrically conducting, but magnetically nonconducting material, particularly the ceramic composite material $Al_2O_3$—TiC. The counterblock 9 is grounded, for example via an electrical connection with a substrate 5.

The thin-film magnetic head shown in the Figures can be manufactured by providing the substrate 5 with a structured, electrically insulating layer 11 and by subsequently providing a first magnetic flux guide 13, an inductive transducing element 15, a second magnetic flux guide 17, a test and/or bias winding 19, a third, interrupted magnetic flux guide 21a, 21b and a magnetoresistive element 23. The electrically insulating layer 11, and other necessary electrically insulating, non-magnetic layers such as 11a to 11g, can be formed, for example by means of PE-CVD (Plasma-Enhanced Chemical Vapour Deposition) of $SiO_2$.

After structuring, for example by means of etching the electrically insulating layer 11, the substrate 5 is provided with an electrically conducting surface 5a by means of sputter-etching and subsequently the first flux guide 13 and an electrically conducting first layer portion 14a are formed by deposition, for example sputtering deposition of a soft-magnetic, electrically conducting material such as an FeNbSi alloy, a CoZrNb alloy, an FeSiAl alloy or an NiFe alloy. The inductive transducing element 15, which may be used as a write winding, and the winding 19 may each be formed, for example by successively sputtering Au and by structuring the gold layer obtained by means of known techniques, for example etching. The second flux guide 17 and the third flux guide 21a, 21b can be formed similarly as the first flux guide 13. After the insulating layer 11e has been provided, a layer of a magnetoresistive material is provided for which purpose an alloy of NiFe is sputtered in this embodiment. Subsequently, the layer formed is structured, for example by means of a photoresist mask and etching so as to form the magnetoresistive transducing element (MR element) 23. In this embodiment, equipotential strips 25 for forming a barberpole structure are subsequently provided on the MR element 23. The transducing elements 15 and 23, and the winding 19 are connected to external contact faces 24 via conductor strips (not shown).

The method described above has the further particular characteristic features that (1) simultaneously with the formation of the second flux guide 17 an electrically conducting second layer portion 14b is formed on the first layer portion 14a, (2) simultaneously with the formation of the winding 19 an electrically conducting third layer portion 14c is formed on at least the second layer portion 14b, (3) simultaneously with the formation of the third flux guide 21a, 21b an electrically conducting fourth layer portion 14d is formed on the third layer portion 14c, and (4) simultaneously with the formation of the equipotential strips 25 an electrically conducting fifth layer portion 14e is formed on the fourth layer portion 14d. The layer portion 14c also extends across the electrically insulating layer 11c and constitutes a ground conductor 16 which at one end is in direct electrical contact with the substrate 5 via the layer portions 14a and 14b and at the other end constitutes an external abutting face 18 via the layer portions 14d and 14e. Lead-through apertures 20 are provided in the electrically insulating layers 11, 11a and 11c for the layer portions 14a to 14c, for example by means of etching, when the method according to the invention is being carried out.

After the formation of the multilayer structure 7 described above, the counterblock 9 is glued onto the insulating layer 11g, whereafter the assembly obtained can be provided with a head face 27 by means of grinding and/or polishing. If desired, a wear-resistant, possibly electrically conducting layer, for example a chromium nitride layer, can be provided on the head face.

Figure 2:
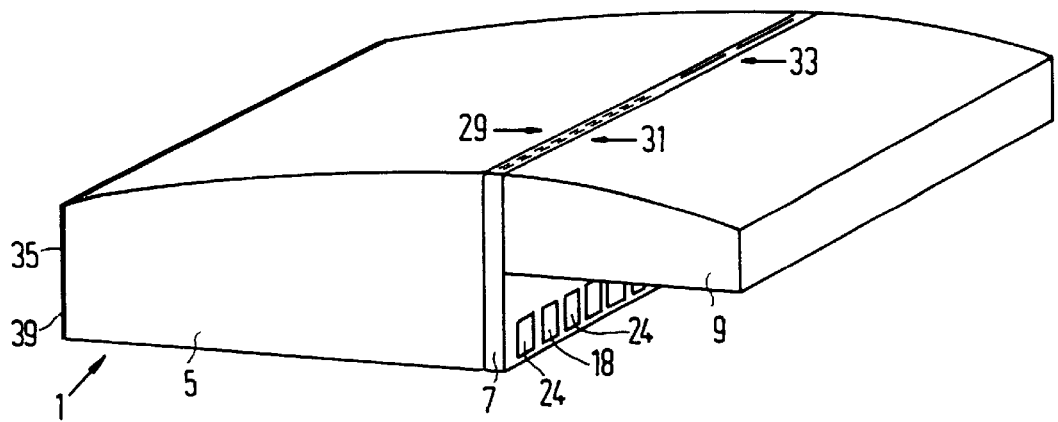
FIG. 2 is a perspective elevational view of an embodiment of the magnetic head according to the invention.
Figure 3:
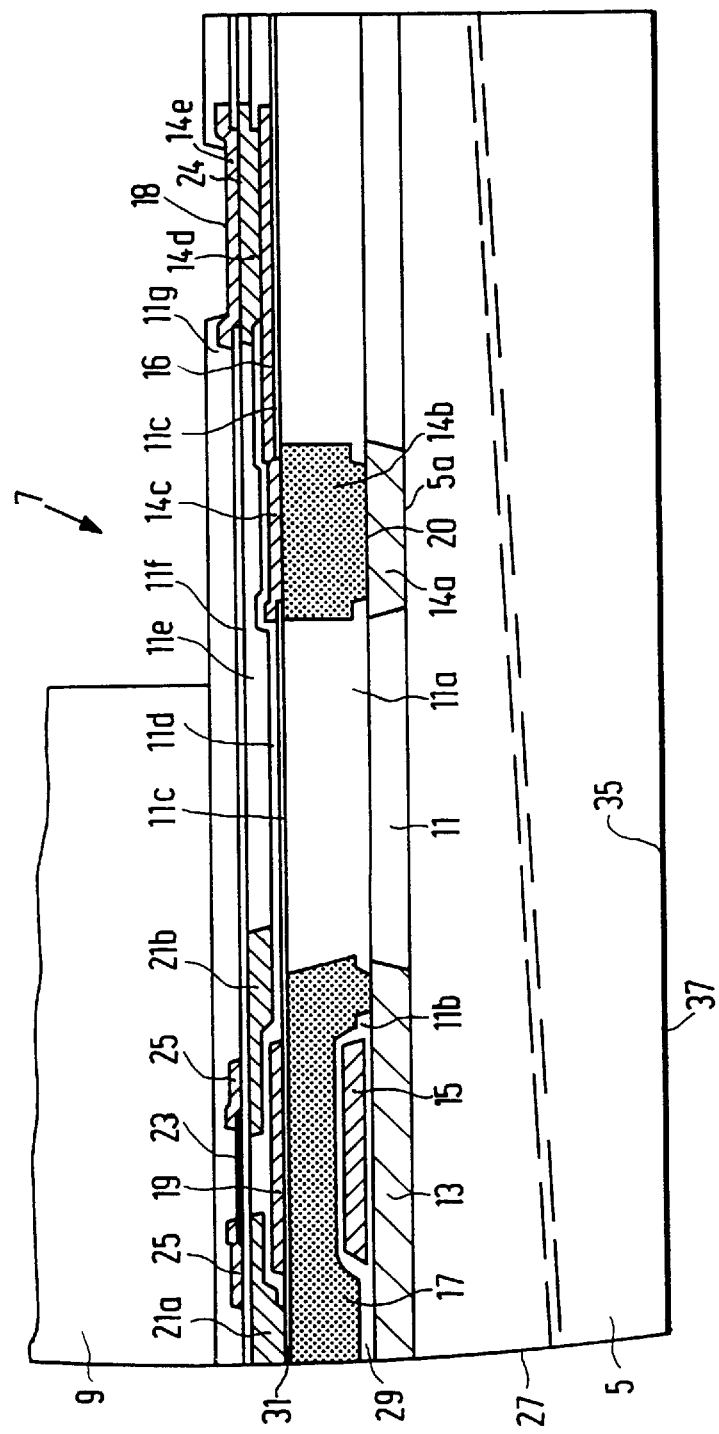
FIG. 3 is a cross-section of the magnetic head of FIG. 2 before it is provided with a contact layer.

The magnetic head 1 shown in FIGS. 2 and 3 is suitable, inter alia for use in a DCC apparatus. In this embodiment the magnetic head has nine gaps 29 for digital writing of information on a magnetic tape, nine gaps 31 for digital reading of information and two gaps 33 for analog reading.

Before magnetic head 1 is built into the support 3 (see also FIG. 1), an outer side 35 of the $Al_2O_3$—TiC substrate 5 is treated., In fact, it has been found that after the manufacture of the magnetic head 1 the electrically conducting substrate 5 has an electrically nonconducting outer surface due to the presence of an electrically insulating layer 37. In the present embodiment this layer 35 is found to be caused by $TiO_2$ which is produced on the outer surface of the substrate 5 by processing operations and/or ambient influences.

It has been found that the electrically insulating layer 37 can be removed in an efficient manner by sputter-etching of the magnetic head placed in a low-pressure space of a sputtering device. The sputter-etching operation may be performed, for example in an argon ambience at a pressure of, for example 1 Pa.

After the electrically insulating layer 37 on the outer side 35 has been removed completely, an electrically conducting material for forming an electrically conducting contact layer 39 is deposited on the electrically conducting surface obtained. To this end, the same low-pressure space is preferably used, in which by means of sputtering, for example RF diode sputtering at 1 Pa in, for example an argon ambience, Cr is deposited on the outer side 35 from which the electrically insulating layer 37 has been removed.

For manufacturing the magnetic head unit according to the invention, the magnetic head 1 provided with the contact layer 39 is placed in a central aperture 41 in the support 3, which is made of metal in this embodiment, and is subsequently positioned with respect thereto. To this end the outer side 35 of the magnetic head is urged against two positioning projections 43a and 43b of the support 3, while also the electrically conducting contact layer 39 is brought into electrical contact with the support 3. Subsequently, the magnetic head 1 is secured to the support 3 by means of an adhesive 45, preferably an electrically conducting adhesive such as an epoxy resin filled with silver.

The magnetic head unit according to the invention also has an electrically non-conducting base 47, for example of polycarbonate filled with glass fibre on which the support 3 is secured. The base 47 has fixation apertures 49 for fixing the magnetic head unit in a magnetic tape apparatus. The support 3 has tape guiding elements 51 for guiding a magnetic tape along the magnetic head.

It is to be noted that the invention is not limited to the embodiments shown. For example, instead of the block 5, the counterblock 9 may be considered as the substrate and a substrate of silicon or of an electrically conducting ferrite may be used. Moreover, instead of the magnetic head shown with a read function as well as a write function, a magnetic head having only one of these functions may be used.

We claim:

1. A method of manufacturing a magnetic head unit including a magnetic head unit and a support, the magnetic head comprising an electrically conducting substrate and a multilayer structure, having a transducing element, arranged against the substrate and the substrate secured to the support, said method comprising, treating a surface of said substrate remote from said magnetic head to remove any electrically insulating layer present on said surface and form an exposed surface on said substrate remote from said multilayer structure, depositing an electrically conducting material on the exposed surface to thereby form an electrically conducting contact layer on said exposed surface and then securing the magnetic head to the support while contacting the electrically conducting contact layer to the support.

2. A method as claimed in claim 1, characterized in that a substrate of electrically conducting aluminum oxide titanium carbide ($Al_2O_3$—TiC) is used as a substrate, in which the electrically insulating layer comprises titanium oxide formed by oxidation, which layer is removed before the electrically conducting contact layer is formed.

3. A method as claimed in claim 1, characterized in that a silicon substrate is used as a substrate, in which the electrically insulating layer comprises silicon oxide formed by oxidation, which layer is removed before the electrically conducting contact layer is formed.

4. A method as claimed in claim 1, characterized in that a substrate of an electrically conducting ferrite is used as a substrate, in which the electrically insulating layer is a surface layer formed by mechanical treatment, which layer is removed before the electrically conducting contact layer is formed.

5. A method as claimed in claim 1, 2, 3 or 4, characterized in that the electrically insulating layer is removed by means of sputter-etching in a low-pressure space, whereafter the electrically conducting layer is formed by means of sputtering in a low-pressure space.

6. A method as claimed in claim 1, 2, 3, 4 or 5, characterized in that an electrically conducting adhesive is provided between the electrically conducting contact layer on the substrate and the support.

7. A method of manufacturing a magnetic head for use in the method as claimed in claim 1, 2, 3, 4, 5 or 6, starting from an electrically conducting substrate on which a multilayer structure having a transducing element is formed, characterized in that electrically conducting material for forming a ground conductor is deposited during formation of the multilayer structure, the ground conductor being electrically connected to the substrate.

8. A method as claimed in claim 7, characterized in that prior to depositing electrically conducting material for forming the ground conductor, a lead-through aperture extending as far as the substrate is provided in an insulation layer which is already present on the substrate, and the substrate is provided with an electrically conducting surface at the area of the lead-through aperture, whereafter electrically conducting material for forming the ground conductor and a connection between the ground conductor and the substrate is deposited on the insulation layer and, through the lead-through aperture, on the electrically conducting surface of the substrate.

9. A method as claimed in claim 2, characterized in that the electrically insulating layer is removed by means of sputter-etching in a low-pressure space, whereafter the electrically conducting layer is formed by means of sputtering in a low-pressure space.

10. A method as claimed in claim 3, characterized in that the electrically insulating layer is removed by means of sputter-etching in a low-pressure space, whereafter the electrically conducting layer is formed by means of sputtering in a low-pressure space.

11. A method as claimed in claim 4, characterized in that the electrically insulating layer is removed by means of sputter-etching in a low-pressure space, whereafter the electrically conducting layer is formed by means of sputtering in a low-pressure space.

12. A method as claimed in claim 2, characterized in that an electrically conducting adhesive is provided between the electrically conducting contact layer on the substrate and the support.

13. A method as claimed in claim 3, characterized in that an electrically conducting adhesive is provided between the electrically conducting contact layer on the substrate and the support.

14. A method as claimed in claim 4, characterized in that an electrically conducting adhesive is provided between the electrically conducting contact layer on the substrate and the support.

15. A method as claimed in claim 5, characterized in that an electrically conducting adhesive is provided between the electrically conducting contact layer on the substrate and the support.

16. A method of manufacturing a magnetic head for use in the method as claimed in claim 2, starting from an electrically conducting substrate on which a multilayer structure having a transducing element is formed, characterized in that electrically conducting material for forming a ground conductor is deposited during formation of the multilayer structure, the ground conductor being electrically connected to the substrate.

17. A method of manufacturing a magnetic head for use in the method as claimed in claim 3, starting from an electrically conducting substrate on which a multilayer structure having a transducing element is formed, characterized in that electrically conducting material for forming a ground conductor is deposited during formation of the multilayer structure, the ground conductor being electrically connected to the substrate.

18. A method of manufacturing a magnetic head for use in the method as claimed in claim 4, starting from an electrically conducting substrate on which a multilayer structure having a transducing element is formed, characterized in that electrically conducting material for forming a ground conductor is deposited during formation of the multilayer structure, the ground conductor being electrically connected to the substrate.

19. A method of manufacturing a magnetic head for use in the method as claimed in claim 5, starting from an electrically conducting substrate on which a multilayer structure having a transducing element is formed, characterized in that electrically conducting material for forming a ground conductor is deposited during formation of the multilayer structure, the ground conductor being electrically connected to the substrate.

20. A method of manufacturing a magnetic head for use in the method as claimed in claim 6, starting from an electrically conducting substrate on which a multilayer structure having a transducing element is formed, characterized in that electrically conducting material for forming a ground conductor is deposited during formation of the multilayer structure, the ground conductor being electrically connected to the substrate.

* * * * *

UNITED STATES PATENT AND TRADEMARK OFFICE
CERTIFICATE OF CORRECTION

PATENT NO. : 5,832,591
DATED : November 10, 1998
INVENTOR(S) : GERARDUS M. DOHMEN, JOHANNES P. HAISMA, VICTOR ZIEREN It is certified that error appears in the above-identified patent and that said Letters Patent is hereby corrected as shown below:

Claim 5, line 1, delete "2,3 or 4".

Claim 6, line 1, delete "2,3,4 or 5".

Claim 7, line 1, delete "2,3,4,5 or 6".

Signed and Sealed this

Eleventh Day of May, 1999

Attest:

Q. TODD DICKINSON

*Attesting Officer*          *Acting Commissioner of Patents and Trademarks*